United States Patent [19]

McMahon

[11] Patent Number: 5,787,410
[45] Date of Patent: Jul. 28, 1998

[54] METHOD AND APPARATUS FOR STORING AND RETRIEVING DATA IN MULTIPLE LANGUAGES SIMULTANEOUSLY USING A FULLY-POPULATED SUB-TABLE

[75] Inventor: Douglas James McMahon, Belmont, Calif.

[73] Assignee: Oracle Corporation, Redwood Shores, Calif.

[21] Appl. No.: 603,658

[22] Filed: Feb. 20, 1996

[51] Int. Cl.⁶ .................................................. G06F 17/30
[52] U.S. Cl. ............................. 707/1; 707/100; 707/3; 707/101
[58] Field of Search ........................... 395/611; 364/200, 364/419.08; 707/1, 100, 3, 101

[56] References Cited

U.S. PATENT DOCUMENTS

| 4,918,593 | 4/1990 | Huber | 364/200 |
|---|---|---|---|
| 5,261,093 | 11/1993 | Asmuth | 395/611 |
| 5,528,491 | 6/1996 | Kuno et al. | 364/419.08 |

Primary Examiner—Thomas G. Black
Assistant Examiner—Frantz Coby
Attorney, Agent, or Firm—Blakely, Sokoloff, Taylor, & Zafman LLP

[57] ABSTRACT

The present invention provides a computer implemented method and apparatus for storing and retrieving data in a database management system (DBMS) in multiple languages, simultaneously, using a fully-populated Sub-Table. In one embodiment, the method and apparatus include generating a Base Table and a Translation Sub-Table. The Base Table includes base rows, each having a primary key and zero or more untranslatable values, exclusive of translatable data values. The Translation Sub-Table includes sets of sub-table rows, wherein each set of sub-table rows corresponds to a base row in the Base Table. In each set of sub-table rows, a sub-table row is provided for each operational language having at least one translatable data value corresponding to the primary key of the respective base row.

39 Claims, 6 Drawing Sheets

Base Table 302

PRODUCTS

| PARTNO | PRICE | |
|---|---|---|
| 10001 ←304 | $10 ←305 | ←303 |
| 10002 ←306 | $20 ←307 | |

Translation Sub-Table 340

PRODUCTS_SUB

| LANGUAGE | PARTNO | NAME | DESCRIPTION | VALID_FLAG | |
|---|---|---|---|---|---|
| English 380 | 10001 350 | Widget 360 | cool thing 370 | True 342 | ←320 |
| English 382 | 10002 352 | Object 362 | way cool 372 | True 344 | ←322 |
| French 384 | 10001 354 | Le Widget 364 | le cool 374 | True 346 | ←324 |
| French 386 | 10002 356 | Le Object 368 | le way cool 378 | True 348 | ←326 |

Fig. 3

METHOD AND APPARATUS FOR STORING AND RETRIEVING DATA IN MULTIPLE LANGUAGES SIMULTANEOUSLY USING A FULLY-POPULATED SUB-TABLE

BACKGROUND OF THE INVENTION

1. Field of the Invention

The present invention relates to database management systems, and in particular, storage and retrieval of data in multiple languages, simultaneously, using a fully-populated Sub-Table.

2. Description of Related Art

The growth of multi-national businesses has given rise to a need for database management system (DBMS) applications in multiple languages. Traditionally, internationalizing DBMS applications has meant doing translations and localizations of the application for each country. This enables the same application to be sold in different countries with local features and in different languages, but each particular translation can operate in only one chosen language.

For example, consider the example of a Table of Products, set forth below.

| PRODUCTS PARTNO | NAME | DESCRIPTION | PRICE |
|---|---|---|---|
| 10001 | Widget | cool thing | $10 |
| 10002 | Object | way cool | $20 |

In the example, the PARTNO column is an untranslated primary key column. The NAME column is an indexed unique key for the table provided as translated values. Translated and untranslated values, as discussed herein, are data items stored in a DBMS that are language dependent and independent, respectively. The DESCRIPTION column is an un-indexed column that includes translated values. The PRICE column includes untranslated values corresponding to the respective primary keys.

Under the traditional translation approach, the data in the Products Table would be converted to a target language. Otherwise stated, the data model of the application is unchanged. Every time a user desires the contents of the database in a language different from the original language, the contents must first undergo a costly translation to a target language. For example, the Table of Products as converted to French would be provided as:

| PRODUCTS PARTNO | NAME | DESCRIPTION | PRICE |
|---|---|---|---|
| 10001 | Le Widget | le cool | $10 |
| 10002 | Le Object | le way cool | $20 |

The evident limitations of the traditional translation approach include limiting translations to translation algorithms present on the system being used, and the extra processing power and user response time consumed to perform the translation each time a data item is desired in a different language.

In order for multi-lingual DBMS applications to run efficiently, the multiple languages of the application should be available to a user simultaneously, so as to avoid the cost of performing the translation each time a data item is desired in a language different from the original language of the DBMS. In order to support the multi-lingual operations, however, the data structure storing the data items requires substantial modification. Traditionally, three main strategies have been used to provide simultaneous multi-lingual capability: Duplicate Columns; Duplicate Rows; and Translation Tables.

Duplicate Columns

The most common of the simultaneous approaches is Duplicate Columns. In this scheme, each translated value column is duplicated once for each operational language, as shown below with the Table of Products:

| PRODUCTS PARTNO | NAME | NAME_FRENCH | DESCRIPTION | DESCRIPTION_FRENCH | PRICE |
|---|---|---|---|---|---|
| 10001 | Widget | Le Widget | cool thing | le cool | $10 |
| 10002 | Object | Le Object | way cool | le way cool | $20 |

The number of languages that can be supported by the Duplicate Column approach, however, is fixed. The operational languages are explicitly hard-wired, or they are soft-wired through a table of languages. Either way, the total number of operating languages is fixed at application design and cannot be easily expanded.

Moreover, the number of languages that can be installed initially is limited. The number of columns required under the Duplicate Columns approach is the product of the number of languages and the number of translated columns. If either is very large, the DBMS may run into implementation limits. For example, with five translated columns and 200 other columns, a maximum of 10 languages can be supported on a DBMS which imposes a 250-column limit.

Moreover, as the number of languages installed on the DBMS increases, extra work must be done to read through all the translations even when only one is desired. Data is stored and processed by row in a DBMS, and the Duplicate Columns approach co-locates the translations with the other row data.

In addition, if indexes constraints or uniqueness constraints are present on any of the translated columns, then these must be repeated for each instance of the column, especially if the index is being used to improve query performance or to enforce the constraints. Also, note that row insertion overhead is sensitive to the number of indexes which need to be checked/validated, and that the number of indexes (if any) is multiplied by the number of languages in this design.

The query performance of the Duplicate Columns approach also has drawbacks. It is quite difficult to build a user interface which offers a single-language view of the data, especially while offering a good query performance. For example, if a view were built over the table that expressed a translated user key column in the current language, it would have to perform a function-like operation on the set of columns to select the desired one. The presence of such a function-like operation would render any indexed access path unavailable to the user interface application.

Duplicate Rows

A second common approach is the Duplicate Rows approach. In this scheme, a LANGUAGE column is added as a primary key of the table, and one row exists per item per language. For example:

| PRODUCTS LANGUAGE | PARTNO | NAME | DESCRIPTION | PRICE |
| --- | --- | --- | --- | --- |
| English | 10001 | Widget | cool thing | $10 |
| English | 10002 | Object | way cool thing | $20 |
| French | 10001 | Le Widget | le cool | $10 |
| French | 10002 | Le Object | le way cool thing | $20 |

The main drawback of this approach is that it requires redundant storage and maintenance of untranslated column values (e.g., the PRICE column). This not only wastes storage, but means that an update to any untranslated value in a row must also be made in each row representing a separate language.

In addition, if the DBMS needs to provide the user with a view of all translations, the necessary query to produce the translations must expend extra processing power to eliminate the unnecessary redundant data, or must expend network/communication power to transport redundant data to the client application.

Translation Tables

A third approach uses Translation Tables. In this scheme, data values of a base language are used to generate a Base Table, and one or more additional translation tables. For example, consider the Table of Products example set forth below, generated under a Translation Table approach. In the Base Table (Products), the translatable values are provided in English, and in the Translation Table (Translations), the translatable values are provided in French.

| PRODUCTS PARTNO | NAME | DESCRIPTION | PRICE | NAME_TID | DESCRIPTION_TID |
| --- | --- | --- | --- | --- | --- |
| 10001 | Widget | cool thing | $10 | 2001 | 2002 |
| 10002 | Object | way cool | $20 | 2003 | 2004 |

| TRANSLATIONS TRANS_ID | LANGUAGE | TRANSLATION |
| --- | --- | --- |
| 2001 | French | Le Widget |
| 2002 | French | le cool |
| 2003 | French | Le Object |
| 2004 | French | le way cool |

As shown in the example, a single table of translations is provided for all translated values. Variants of this approach might use one translation table per translatable entity, linked either with a special translation ID column (as shown) or by repetition of the primary key.

The Translation Table approach has several drawbacks. Indexes and uniqueness constraints involving the translated columns are very difficult to do correctly with a single Translation Table because the types of translated values stored within the translation column vary (e.g., NAME vs. DESCRIPTION). A separate Translation Table must be provided for each translated entity in the Base Table for that to even be possible. Even in this case the indexes and uniqueness constraints on the translated values must still be defined twice, once for the Base Table and once for the Translation Table. Also note that in cases where a translated column is part of a key value, but not the first column, a proper index is not possible without duplicating the key in the Translation Table. Moreover, because of the index problems noted, query paths through the Translation Table will not perform as well. Only queries which go against the Base Table values, or against the base language, will operate with acceptable performance for large tables.

The defaulting scheme used in Translation Tables also has significant drawbacks. One problem is that, in cases where a translation of a translated value is unavailable, the corresponding translated value of the base language in the Base Table is supplied as a default through the use of an outer-join (or the equivalent) against the Translation Table. Thus, searches which drive off of a translated value must fully scan both the Translation Table and the Base Table, and merge the results, to avoid producing unwanted duplicates through the query.

Another problem is that situations can arise where the defaulted translated value, derived from a different language, appears through the query to conflict with a valid translation on another row, because uniqueness constraints cannot be enforced across languages.

As shown by the drawbacks of the common approaches discussed above, there exist a need for an efficient method and apparatus for storing and retrieving data values in a DBMS in multiple languages simultaneously.

SUMMARY OF THE INVENTION

The present invention provides a computer implemented method and apparatus for storing and retrieving data in a database management system (DBMS) in multiple languages, simultaneously, using a fully-populated Sub-Table. In one embodiment, the method and apparatus include generating a Base Table and a Translation Sub-Table. The Base Table includes base rows, each having a primary key and zero or more untranslatable values, exclusive of translatable data values. The Translation Sub-Table includes sets of sub-table rows, wherein each set of sub-table rows corresponds to a base row in the Base Table. In each set of sub-table rows, a sub-table row is provided for each operational language having at least one translatable data value corresponding to the primary key of the respective base row.

In order to allow single maintenance and defining of index and uniqueness constraints, the present invention treats all translated values the same and stores the translated values in one Translation Table separate from the Base Table. This approach also avoids redundant storage of the untranslated values and allows for a greater number of languages to be supported by the DBMS without incurring a loss in performance.

In addition, the present invention processes a defaulting scheme only once, that is, during an insertion of a translated value. Performing the default during the storage of the translated values, as opposed to the retrieval of the translated values, takes advantage of the fact that most rows are created once and read many times.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates an example of a Base Table and a Translation Sub-Table as generated in the present invention.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

HARDWARE OVERVIEW

Figure 1:
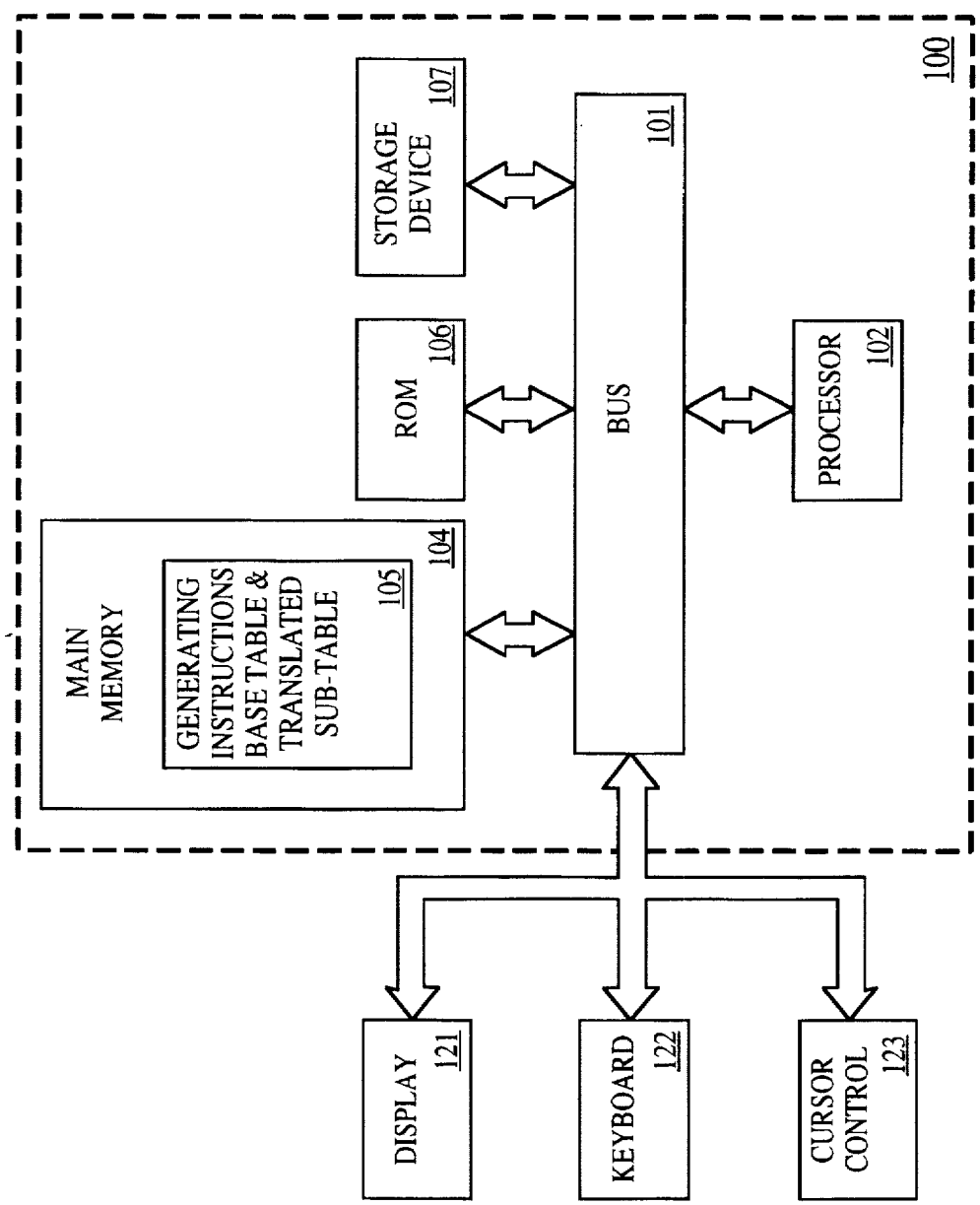
FIG. 1 is a block diagram of a system which may be programmed to implement the present invention.

Referring to FIG. 1, the computer system upon which one embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Main memory 104 is shown storing a set of instructions 105 for generating a Base Table and Translated Sub-Table of the present invention. Computer system 100 also comprises a read only memory (ROM) and/or other static storage device 106 coupled to bus 101 for storing static information and instructions for processor 102. Data storage device 107 is coupled to bus 101 for storing information and instructions. A data storage device 107 such as a magnetic disk or optical disk and its corresponding disk drive can be coupled to computer system 100. In alternative embodiments, the set of instructions 105 for generating a Base Table and Translated Sub-Table of the present invention can be stored on any machine readable medium, including magnetic and optical disks. The set of instructions 105 may also be hardwired to a computer system such as computer system 100.

Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

SIMULTANEOUS MULTI-LINGUAL DBMS

The present invention can be implemented on a computer system 100 to implement a DBMS application operable in multiple languages simultaneously. In one embodiment, the translated and untranslated values are maintained in separate tables, a Base Table and a Translation Sub-Table, respectively. The Base Table is exclusive of translated values, including only primary keys and, optionally, untranslated values in each row. The translation Sub-Table is fully-populated with rows containing translated values, valid or invalid, at all times, thereby providing several performance advantages to be discussed.

Figure 2A:
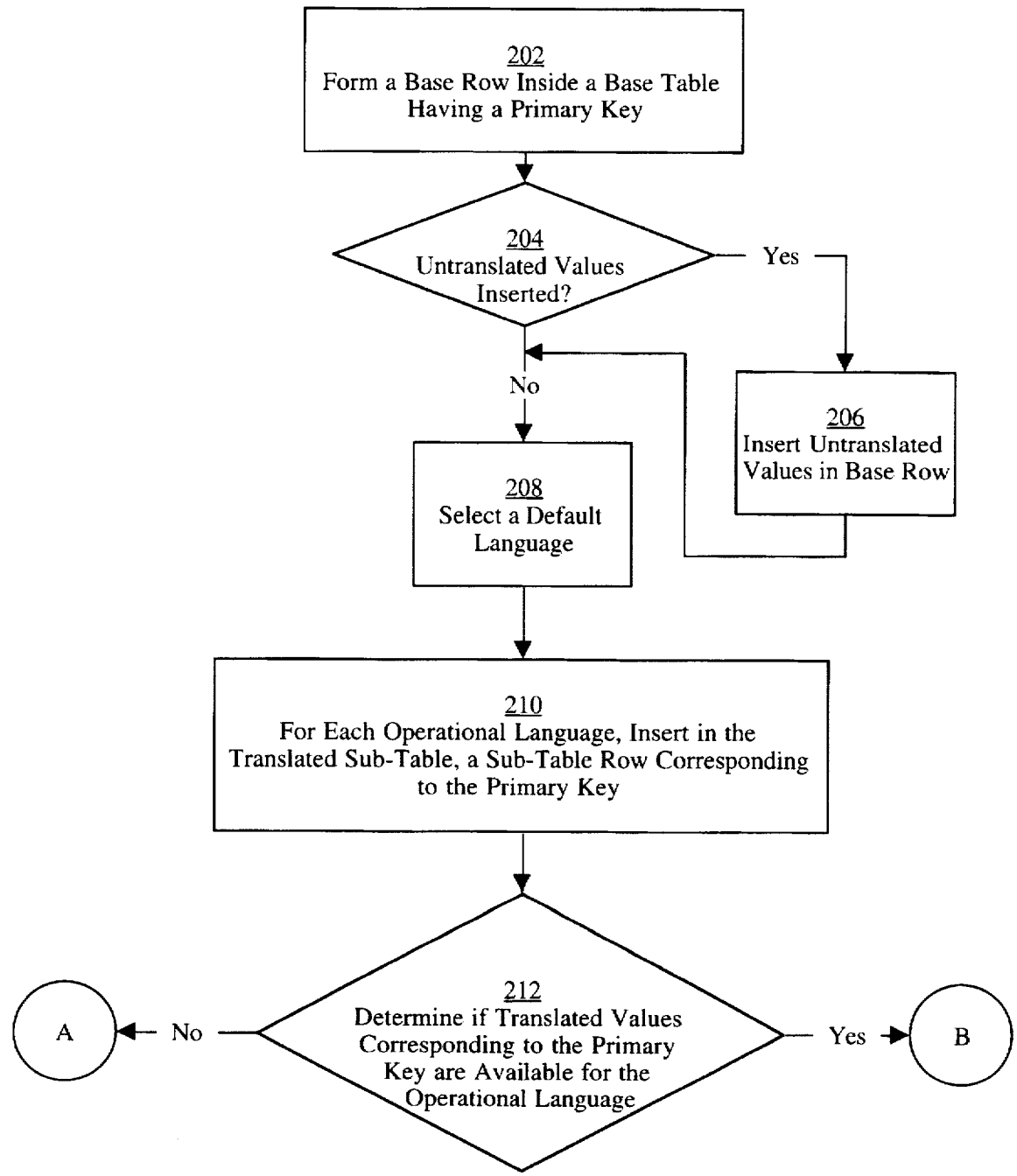
FIGS. 2a and 2b are a single flow diagram illustrating steps, in the present invention, for generating a Base Table and a Translation Sub-Table.
Figure 2B:
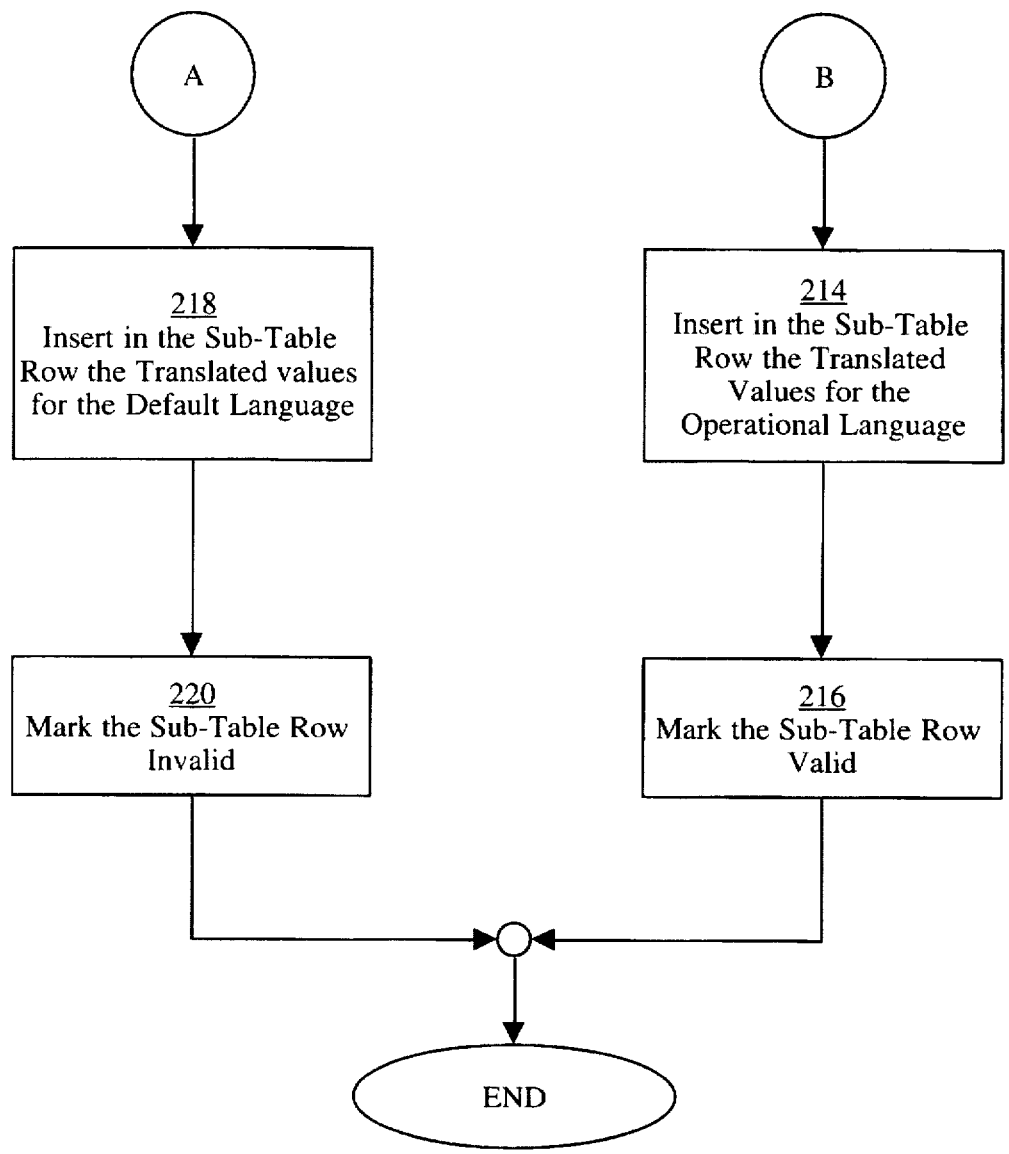

FIG. 2 is a flow diagram of the present invention, illustrating the steps of generating the Base and the translation Sub-Table of a simultaneous multilingual DBMS. In one embodiment of the invention, the processor 102 executes the set of instructions to generate the tables. In addition, FIG. 3 illustrates a Base and translation Sub-Table as generated in the present invention.

In block 202, formation of the Base Table 302 begins by inserting a base row 303 with a corresponding primary key 304. In conditional block 204, it is determined whether untranslated values are to be inserted in the respective base rows. If the condition is positive, in block 206, an untranslated value 308 is inserted in the respective base row. Otherwise, the process proceeds to block 208. Note that no translated values are to be inserted in any of the base rows of the Base Table 302.

Processing block 208 initiates the generation of the Translation Sub-Table 340. Specifically, in block 208, an operational language is selected as a default language. In one embodiment, the selection of the default language may be either specified explicitly, or derived from the present value of the CurrentLanguage, an operational language selected by a user for entering queries and operating the DBMS. In step 210, a Sub-Table row (320 and 324) corresponding to a primary key 304 is inserted in the Sub-Table 340 for each language intended to be operationally available on the multilingual DBMS. Each Sub-Table row 320 and 324 inserted includes a copy 350 & 354 of the corresponding primary key 304, the respective language name or ID 380 and 384, and one or more columns for translated values corresponding to the primary key 304.

In conditional block 212, it is determined whether translated values are available for the respective languages corresponding with the primary key 304. If the translated values are available, block 214 is processed, wherein the translated values 360, 364, 370, and 374 for the respective language corresponding to the primary key 304 are inserted in the respective Sub-Table rows 320 and 324. In step 216, the respective Sub-Table rows 320 and 324 are marked valid 342 and 346.

If one or more of the translated values are unavailable, in processing block 218, the translated values for the selected default language corresponding to the primary key are substituted for the unavailable translated value and inserted in the respective Sub-Table row. In block 220, the respective Sub-Table row is marked invalid.

By using the default language's translated value as a substitute when an operational language's translated value is unavailable, the Sub-Table is fully populated. For example, if a particular database had three operational languages installed, and ten base-rows exist in the Base Table, then exactly thirty Sub-Table rows would exists in the Sub-Table, regardless of their state of validity. Otherwise stated, in the present invention, defaulting is done only once, during the insertion of the translated values in the Sub-Table rows.

As previously mentioned, performing the default during the storage of the translated values, as opposed to retrieval of translated values, takes advantage of the fact that most translated values are created once and read many times. For example, consider the defaulting scheme of Translation Tables, as previously discussed in the background section. The defaulting scheme used by the Translation Table occurs every time a missing translated value is desired to be read. Specifically, the approach involves substituting the translated value of the Base language by using an outer-join to connect the corresponding translated values of the base language to the translation table. As such, during a retrieval procedure, when the application comes across the missing translated value, rather than return a default value from the particular Sub-Table row, additional processing is performed by jumping to the Base Table and continuing to expend processing resources by searching for a default value.

In sum, even though, in the present invention, the defaults are created whenever a Sub-Table row is inserted, despite the fact that some of the values may never be required during the life of the system, trading the cost of cheap resources (e.g. disk space) for a more valuable resource, user response time, is a reasonable tradeoff.

Moreover, the use of the straight-joins in the present invention, versus the outer-joins, increases the query performance. More specifically, query paths against the translated values of the Sub-Table can travel through indexed paths and are able to be processed at higher speeds. In contrast, the use of outer-joins requires merging un-indexed queries between the Base Table and the Sub-Table.

In addition, providing translated values in one Sub-Table limits the redundant storage of untranslated data to the primary key values. Moreover, placing the translated values in a single Sub-Table allows for a single definition and maintenance of indexes and uniqueness constraints on the translated value columns, wherein validation of the constraints occurs immediately upon the creation of the rows. In contrast, when the translated values are kept in more than one table, the indexes and constraints must be defined twice, once for the Base Table and once for the Sub-Table. Moreover, the constraints of both tables must be separately maintained.

CONSTRUCTING A VIEW

A view of the tables, in the present invention, can be constructed under defined parameters which render the translated values stored in the Translation Sub-Table into a form identical to the Base Table. Otherwise stated, the user can be provided with transparent access to the Translation Sub-Table. For example, a view could be constructed for the Base and Translation Sub-Table, as illustrated in FIG. 3, under the parameters as defined below.

```
select
    P.PARTNO, T.NAME, T.DESCRIPTON, P.PRICE
        from PRODUCTS P, PRODUCTS_SUB T
    where P.PARTNO = T.PARTNO
        and T. LANGUAGE = Current Language
```

Structured Query Language (SQL) statements could then be used to support queries in a user's current operational language, wherein queries could be issued against any column, translated or otherwise, that run at high performance. The Sub-Table 340 could also be queried for all translated rows by a primary key of a base row, thus allowing the application to fetch and display any combination of translations. Similar constructs could be used in a non-SQL DBMS.

In support of this construction, in the present invention, database triggers or programmatic interfaces can be used to ensure that insert and update operations write appropriate values to the Base Table 302, the translated Sub-Table, or both, as necessary. Moreover, the present construction ensures that each time a base row is deleted, every corresponding Sub-Table row will also be deleted, thereby providing the added benefit of conserving memory space by eliminating the storage of unused data items.

INSTALLING NEW LANGUAGES

Figure 4A:
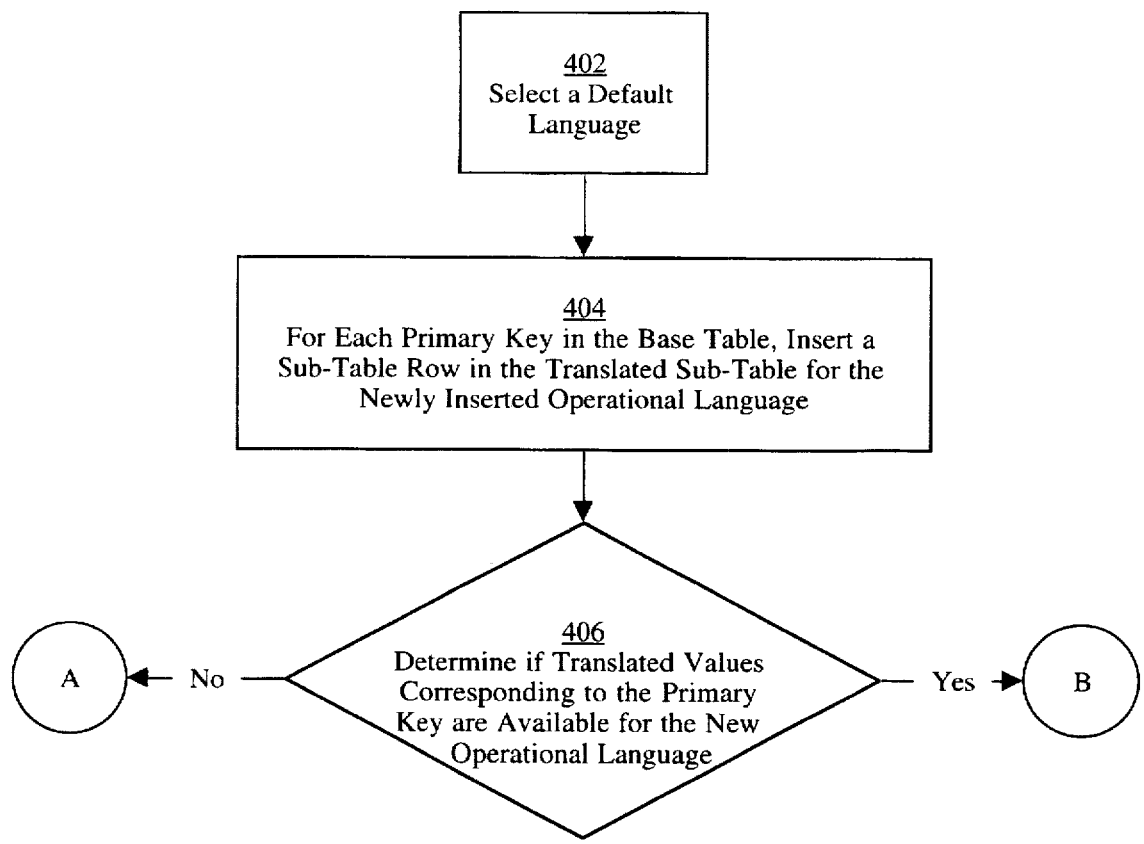
FIGS. 4a and 4b are a single flow diagram illustrating steps, in the present invention, for inserting a new operational language value.
Figure 4B:
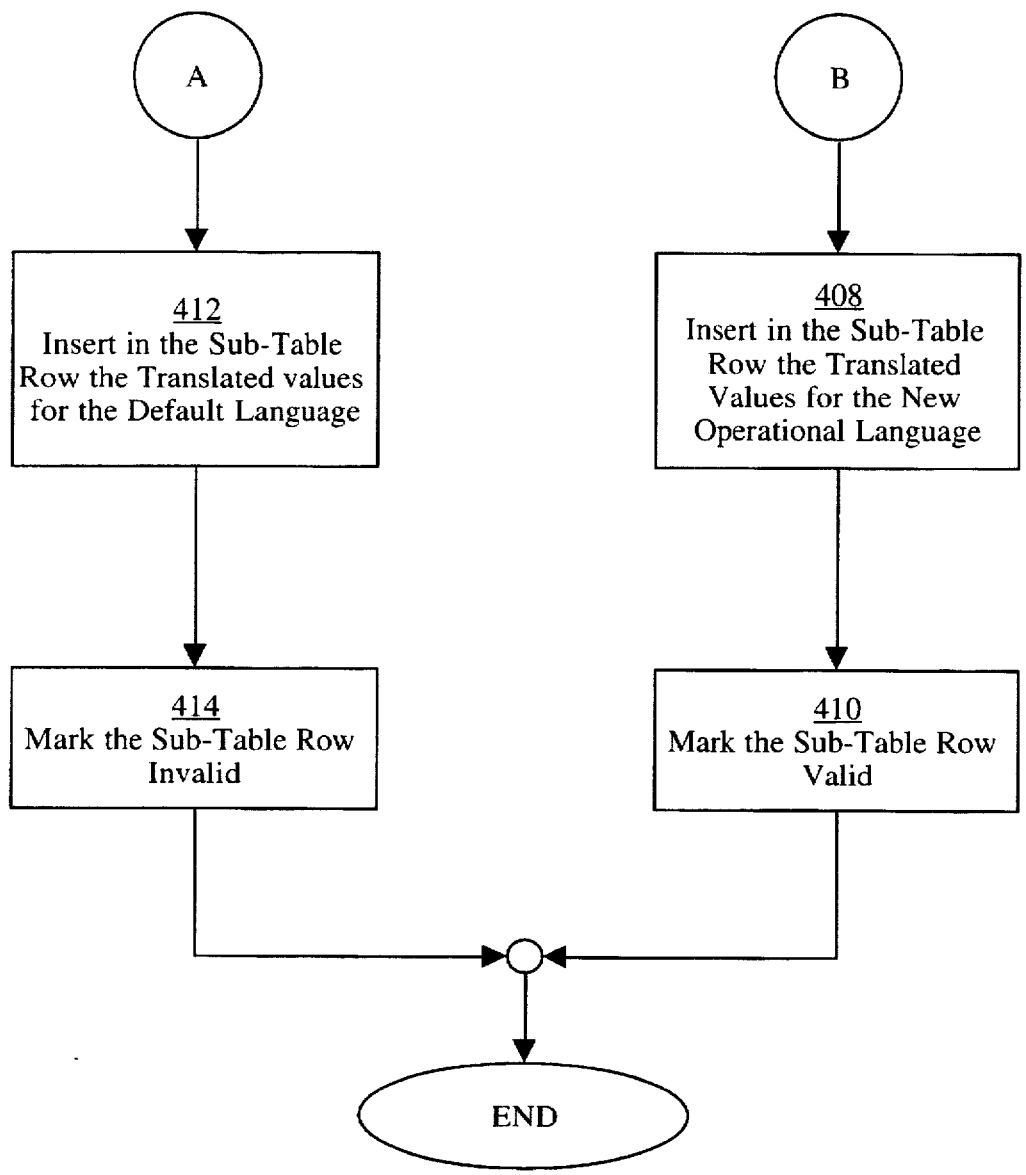

In the present invention, additional languages can be easily added to the list of operational languages. FIG. 4 is a flow diagram of the present invention, illustrating the steps involved in installing an operational language. In block 402, a language is selected as the default language. As described above, the selection may be specified explicitly, or derived from the present value of the CurrentLanguage. In block 404, a new Sub-Table row is created for each base-row in the Base Table. Each newly created Sub-Table row inserted into the Sub-Table includes a copy of the corresponding primary key, the respective language name or ID, and one or more columns for translated values corresponding to the primary key. In conditional block 406, it is determined whether the translated values corresponding to a primary key are available for the newly inserted operational language. If the translated values of the new language are available, block 408 is processed, wherein the translated values are inserted in the respective Sub-Table rows. In block 410, the respective Sub-Table row is marked valid.

If a translated values of the new language is unavailable for the respective primary key, block 412 is processed. In block 412, the translated values for the default language is substituted for the unavailable translated value and inserted in the respective Sub-Table rows. In block 414, the Sub-Table row is then marked invalid.

Illustrated below are examples of how the tables of FIG. 3 would be affected under some test cases. Consider the example of adding German to the set of installed operational languages. Using English as the default language for the installation (we could just as easily have chosen French), the Translation Sub-Table 340 would look as follows:

| PRODUCTS_SUB LANGUAGE | PARTNO | NAME | DESCRIPTION | VALID_FLAG |
|---|---|---|---|---|
| English | 10001 | Widget | cool thing | True |
| English | 10002 | Object | way cool thing | True |
| French | 10001 | Le Widget | le cool | True |
| French | 10002 | Le Object | le way cool thing | True |
| German | 10001 | Widget | cool thing | False |
| German | 10002 | Object | way cool thing | False |

Note that the Base Table would be unaffected by this procedure. Moreover, after a German translation value has been inserted for part 10001, the translated Sub-Table 340 would appear as follows:

| PRODUCTS_SUB LANGUAGE | PARTNO | NAME | DESCRIPTION | VALID_FLAG |
|---|---|---|---|---|
| English | 10001 | Widget | cool thing | True |
| English | 10002 | Object | way cool thing | True |
| French | 10001 | Le Widget | le cool | True |
| French | 10002 | Le Object | le way cool thing | True |
| German | 10001 | Die Widget | das ist cool | True |
| German | 10002 | Object | way cool thing | False |

Suppose a French user inserts a new part into the Base Table 302, number 10003. The new Base 302 and translated Sub-Tables 340 would then include the following:

| PRODUCTS PARTNO | PRICE |
|---|---|
| 10001 | $10 |
| 10002 | $20 |
| 10003 | $30 |

| PRODUCTS_SUB LANGUAGE | PARTNO | NAME | DESCRIPTION | VALID_FLAG |
|---|---|---|---|---|
| English | 10001 | Widget | cool thing | True |
| English | 10002 | Object | way cool thing | True |
| English | 10003 | New | whiz-bang | False |
| French | 10001 | Le Widget | le cool | True |
| French | 10002 | Le Object | le way cool thing | True |
| French | 10003 | Le New | le whiz-bang | True |
| German | 10001 | Die Widget | das ist cool | True |
| German | 10002 | Object | way cool thing | False |
| German | 10003 | Le New | le whiz-bang | False |

From the above description, it will be apparent that the invention disclosed herein provides a novel and advantageous method and apparatus for storing and retrieving data in multiple simultaneous languages using fully-populated Sub-Tables. As will be understood by those familiar with the art, the invention may be embodied in other specific forms without departing from its essential features, and thus, the described embodiments are not restrictive of the scope of the invention. The following claims are indicative of the scope of the invention, and all variations which come within the meaning and range of equivalency of the claims are to be embraced within their scope.

What is claimed is:

1. A computer implemented method for storing and retrieving data values in a database management system (DBMS), said method comprising the steps of:

generating a Base Table, said Base Table including at least one base row having a primary key, said base row exclusive of translatable data values;

generating a fully-populated Sub-Table, said Sub-Table includes a set of fully-populated sub-table rows corresponding to said base row, each said fully-populated row includes at least one translatable data field, said Sub-Table further includes a set of language values, wherein each set of sub-table rows in said Sub-Table corresponds to a separate language value of said set of language values selecting a language value from said set of language values as a default language;

inserting a second base row in said Base Table; and in response to inserting said second base row in said Base Table, generating a second set of sub-table rows in said Sub-Table, each row of said second set corresponding to a separate language value of said set of language values, wherein at least one of said rows in said second set is generated by copying a translatable data value of said default language.

2. The method of claim 1, wherein the step of generating said second set of sub-table rows, further includes the step of:

marking invalid, said row generated by copying a translatable data value of said default language.

3. The method of claim 1, wherein in the step of generating said second set of sub-table rows, at least one of said sub-table rows is generated by inserting a translatable data value of a language value different from said default language.

4. The method of claim 3, wherein the step of generating a set of sub-table rows, further includes the steps of:

marking valid, said row generated by inserting translatable data value of said language value different from said default language.

5. The method of claim 4, further including the steps of:

inserting a third base row in said Base Table, said third base row having a primary key;

generating, in response to inserting said third base row in said Base Table, a third set of sub-table rows in said Sub-Table corresponding to said third base row, said third set of sub-table rows including a row corresponding to each language value of said set of language values and at least one translatable data value.

6. The method of claim 5, further including the steps of:

inserting in said set of language values of said Sub-Table, a new language value;

generating, in response to inserting said new language value, a set of sub-table rows corresponding to said new language, wherein each row of said set includes a translatable data value corresponding to a separate base row of said Base Table.

7. The method of claim 6, wherein in the step of generating, in response to inserting said new language value, a set of sub-table rows, at least one of said rows, of said set of sub-table rows corresponding to said new language, is generated by copying a translatable data value of said default language.

8. The method of claim 7, wherein the step of generating, in response to inserting said new language value, a set of sub-table rows, further includes the step of:

marking invalid, said row generated by copying a translatable data value of said default language.

9. The method of claim 7, wherein in the step of generating, in response to inserting said new language value, a set of sub-table rows, at least one of said rows, of said set of sub-table rows corresponding to said new language, is generated by inserting a translatable data value of said new language value.

10. The method of claim 9 wherein the step of generating, in response to inserting said new language value, a set of sub-table rows, further includes the steps of:

marking valid, said row generated by inserting a translatable data value of said one language value.

11. The method of claim 9, further including the steps of:

deleting a base row from said Base Table; and deleting, in response to deleting said base row from said Base Table, all sub-table rows corresponding to said base row.

12. The method of claim 11, wherein base rows of said Base Table include at least one untranslated value.

13. A machine-readable medium having stored thereon data representing sequences of instructions for storing and retrieving data values in a database management system (DBMS), said sequences of instruction which, when executed by a processor, cause said processor to perform the steps of:

generating a Base Table, said Base Table including at least one base row having a primary key, said base row exclusive of translatable data values;

generating a fully-populated Sub-Table, said Sub-Table includes a set of fully-populated sub-table rows corresponding to said base row, each said fully-populated row includes at least one translatable data field, said Sub-Table further includes a set of language values, wherein each set of sub-table rows in said SubTable corresponds to a separate language value of said set of language values;

selecting a language value from said set of language values as a default language;

inserting a second base row in said Base Table;

in response to inserting said second base row in said Base Table, generating a second set of sub-table rows in said Sub-Table, each row of said second set corresponding to a separate language value of said set of language values, wherein at least one of said rows in said second set is generated by copying a translatable data value of said default language.

14. The machine-readable medium of claim 13, wherein the step of generating a set of sub-table rows further includes the step of:

marking invalid, said row generated by copying a translatable data value of said default language.

15. The machine-readable medium of claim 13, wherein in the step of generating a set of sub-table rows, at least one of said sub-table rows is generated by inserting a translatable data value of a language value different from said default language.

16. The machine-readable medium of claim 15, wherein the step of generating a set of sub-table rows further includes the steps of:

marking valid, said row generated by inserting translatable data value of said language value different from said default language.

17. The machine-readable medium of claim 16, further including the steps of:

inserting a third base row in said Base Table, said third base row having a primary key;

generating, in response to inserting said third base row in said Base Table, a third set of sub-table rows in said Sub-Table corresponding to said third base row, said third set of sub-table rows including a row corresponding to each language value of said set of language values and at least one translatable data value.

18. The machine-readable medium of claim 17, further including the steps of:

inserting in said set of language values of said Sub-Table, a new language value;

generating, in response to inserting said new language value, a set of sub-table rows corresponding to said new language, wherein each row of said set includes a translatable data value corresponding to a separate base row of said Base Table.

19. The machine-readable medium of claim 18, wherein in the step of generating, in response to inserting said new language value, a set of sub-table rows, at least one of said rows, of said set of sub-table rows corresponding to said new language, is generated by copying a translatable data value of said default language.

20. The machine-readable medium of claim 19, wherein the step of generating, in response to inserting said new language value, a set of sub-table rows, further includes the step of:

marking invalid, said row generated by copying a translatable data value of said default language.

21. The machine-readable medium of claim 18, wherein in the step of generating, in response to inserting said new language value, a set of sub-table rows, at least one of said rows, of said set of sub-table rows corresponding to said new language, is generated by inserting translatable data value of said new language value.

22. The machine-readable medium of claim 21, wherein the step of generating, in response to inserting said new language value, a set of sub-table rows, further includes the step of:

marking valid, said row generated by inserting translatable data value of said one language value.

23. The machine-readable medium of claim 21, further including the steps of:

a) deleting a base row from said Base Table; and b) deleting, in response to deleting said base row from said Base Table, all sub-table rows corresponding to said base row.

24. The machine-readable medium of claim 23, wherein said base rows of said Base Table include at least one untranslated value.

25. A computer system comprising:

a processor;

a computer readable medium coupled to said processor, said computer readable medium readable medium having stored thereon data representing sequences of instructions for storing and retrieving data values in a database management system (DBMS), said sequences of instruction which, when executed by said processor, cause said processor to perform the steps of:

generating a Base Table, said Base Table including at least one base row having a primary key, said base row exclusive of translatable data values;

generating a fully-populated Sub-Table, said Sub-Table includes a set of fully-populated sub-table rows corresponding to said base row, each said fully-populated row includes at least one translatable data field, said Sub-Table further includes a set of language values, wherein each set of sub-table rows in said SubTable corresponds to a separate language value of said set of language values;

selecting a language value from said set of language values as a default language;

inserting a second base row in said Base Table; and in response to inserting said second base row in said Base Table, generating a second set of sub-table rows in said Sub-Table, each row of said second set corresponding to a separate language value of said set of language values, wherein at least one of said rows in said second set is generated by copying a translatable data value of said default language.

26. The computer system of claim 25, wherein the step of generating a set of sub-table rows further includes the step of:

marking invalid, said row generated by copying a translatable data value of said default language.

27. The computer system of claim 25, wherein in the step of generating a set of sub-table rows, at least one of said sub-table rows is generated by inserting a translatable data value of a language value different from said default language.

28. The computer system of claim 27, wherein the step of generating a set of sub-table rows further includes the step of:

marking valid, said row generated by inserting translatable data value of said language value different from said default language.

29. The computer system of claim 28, further including the steps of:

inserting a third base row in said Base Table, said third base row having a primary key;

generating, in response to inserting said third base row in said Base Table, a third set of sub-table rows in said Sub-Table corresponding to said third base row, said thirdset of sub-table rows including a row corresponding to each language value of said set of language values and at least one translatable data value.

30. The computer system of claim 29, further including the steps of:

inserting in said set of language values of said Sub-Table, a new language value;

generating, in response to inserting said new language value, a set of sub-table rows corresponding to said new language, wherein each row of said set includes a translatable data value corresponding to a separate base row of said Base Table.

31. The computer system of claim 30, wherein in the step of generating in response to inserting said new language value, a set of sub-table rows, at least one of said rows, of said set of sub-table rows corresponding to said new language, is generated by copying a translatable data value of said default language.

32. The computer system of claim 31, wherein the step of generating, in response to inserting said new language value, a set of sub-table rows, further includes the step of:

marking invalid, said row generated by copying a translatable data value of said default language.

33. The computer system of claim 31, wherein in the step of generating, in response to inserting said new language value, a set of sub-table rows, at least one of said rows, of said set of sub-table rows corresponding to said new language, is generated by inserting a translatable data value of said new language value.

34. The computer system of claim 33, wherein the step of generating, in response to inserting said new language value, a set of sub-table rows, further includes the step of:

marking valid, said row generated by inserting a translatable data value of said one language value.

35. The computer system of claim 34, further including the steps of:

deleting a base row from said Base Table; and deleting, in response to deleting said base row from said Base Table, all sub-table rows corresponding to said base row.

36. The computer system of claim 35, wherein base rows of said Base Table include at least one untranslated value.

37. In a database management system (DBMS) having a Base Table and a Sub-Table, a method for retrieving a translatable data value the method comprising the steps of:

accessing the Base Table to obtain a non-translatable value, wherein the Base Table includes at least one base row having a non-translatable primary key and said base row is exclusive of translatable data values:

using the non-translatable value to retrieve a translatable data value from the Sub-Table, wherein the Sub-Table includes a set of fully-populated sub-table rows corresponding to the base row, each said fully-populated rows includes at least one translatable data field, said Sub-Table further includes a set of language values, wherein each sub-table row of said set of sub-table rows corresponds to a separate language value of said set of language values.

38. The method of claim 37, wherein the step of using the non-translatable value to retrieve a translatable data value from the Sub-Table further includes retrieving a fully-populated sub-table row from said Sub-Table, wherein a translatable data field of said row has stored therein a translatable data value of a defaulting language.

39. The method of claim 38, wherein said fully-populated sub-table row having said translatable data value of said defaulting language, is marked invalid.

* * * * *